May 22, 1945.   H. L. HARRIS   2,376,592
SPRING WHEEL
Filed Nov. 12, 1942
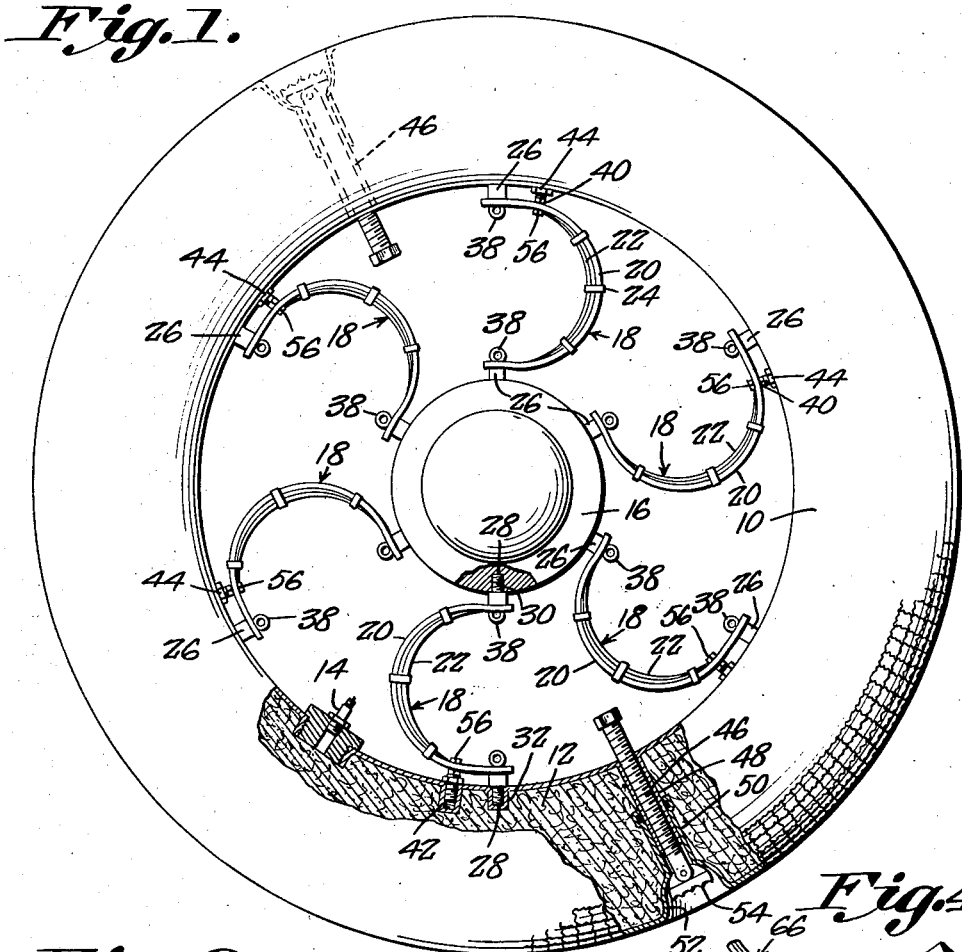
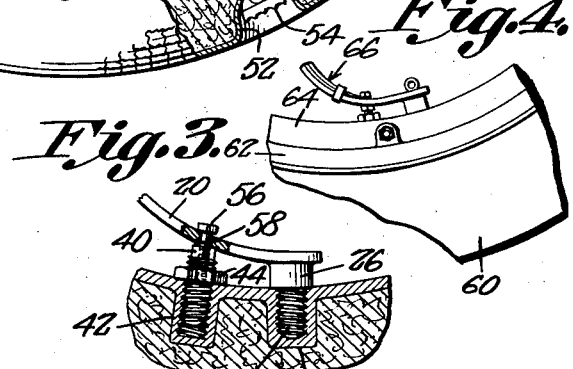
INVENTOR,
Henry L. Harris
BY
Victor J. Evans & Co.
ATTORNEYS Patented May 22, 1945

2,376,592

UNITED STATES PATENT OFFICE 2,376,592

SPRING WHEEL

Henry Levene Harris, Prichard, Ala.

Application November 12, 1942, Serial No. 465,375

3 Claims. (Cl. 152—12)

My invention relates to automotive vehicles and other types of carriers requiring resilient wheels, and has among its objects and advantages the provision of an improved spring wheel.

In the accompanying drawing:

Figure 1 is a side view of a wheel partly in section illustrating my invention.

Figure 2 is a view illustrating the manner in which resilient spokes are conditioned for connection with the hub and rim parts of the wheel.

Figure 3 is a sectional detail view illustrating a spoke tensioning adjustment, and Figure 4 is a fragmentary view of a spring wheel structure in association with a pneumatic tire.

In the embodiment of the invention selected for illustration, Figure 1 illustrates a metallic rim 10 of hollow formation and supplied with a suitable filler 12. An inflating valve 14 is also provided in the event that air is to be supplied to the rim.

The rim 10 is resiliently connected with the hub structure 16 through the medium of spokes 18. These spokes are generally U-shaped in contour when viewed according to Figure 1 and each comprises a spring 20 and a shorter stiffening spring 22 held in assembly therewith by encircling clips 24.

To both ends of the springs 20 are attached bodies 26 each having a threaded stud 28. The studs 28 of each spring are reversely threaded so that the studs may be threaded into the bores 30 in the hub structure 16 and the socket 32 in the rim 10 through rotation of the spring assemblies.

Figure 2 illustrates the manner in which the spokes 18 are bent to facilitate connection with the rim and the hub structure. A turnbuckle 34 is provided with hooks 36 insertable in eyes 38 on the spokes. These eyes are fixedly attached to the springs 20. The turnbuckle is shortened to bend the spring 20 sufficiently far to permit the studs 28 to be brought into axial alignment with the bores 30 and the sockets 32. The turnbuckle is then lengthened gradually to aid in establishing a threaded connection between the studs and their respective threaded openings. The spokes are rotated for turning the studs 28 home and to bring the bodies 26 into frictional engagement with the rim and the hub structure.

The tension of the spokes may be changed through adjustment of tensioning studs 40 threaded into sockets 42 in the rim 10. These studs are spaced short distances from the bodies 26 attached to the rim ends of the spokes. Lock nuts 44 are connected with the studs 40 for frictional engagement with the rim 10.

The rim 10 is provided with at least two radial screws 46 threadedly connected with tubes 48 providing radial openings through the inner face of the rim. These tubes are slidable in tubes 50 terminating in flared openings or recesses 52 in the outer face of the rim. A traction lug 54 is attached to the outer ends of the screws 46 and are normally housed in the recesses 52 but may be projected to traction positions through rotation of the screws 46.

Screws 56 extend loosely through openings 58 in the springs 20 and are threaded into the studs 40. The screws 56 perform bracing functions, as when the wheel is in a sharp bend and when running over rough roads.

Figure 4 illustrates a pneumatic tire 60 mounted on a rim 62 detachably connected with an inner rim 64 with which bowed springs 66 are connected. These springs may be identical with the springs 18.

Without further elaboration, the foregoing will so fully explain my invention, that others may, by applying current knowledge, readily adapt the same for use under various conditions of service.

I claim:

1. A spring wheel comprising a rim, a hub structure, bowed resilient spokes connecting the rim with the hub structure, adjustable screws carried by the rim and having end engagement with the convex sides of the spokes for stiffening the spokes, and holding screws extending through openings in the spokes and threaded into said adjustable screws.

2. A spring wheel construction comprising a rim and a hub, bowed resilient spokes interposed between the rim and hub structure, said rim and hub having radially aligned pairs of oppositely threaded openings, oppositely threaded attaching studs fixed on the respective ends of each spoke and extending perpendicularly to the spoke end portions to engage and be threaded in the openings by turning of the spokes, said spokes providing the leverage for turning the studs.

3. A spring wheel construction comprising a rim and a hub, bowed resilient spokes interposed between the rim and hub structure, said rim and hub having radially aligned pairs of oppositely threaded openings, oppositely threaded attaching studs fixed on the respective ends of each spoke and extending perpendicularly to the spoke end portions to engage and be threaded in the openings by turning of the spokes, said spokes providing the leverage for turning the studs, and tensioning screws threaded into sockets in the rim and engaging the spokes adjacent the outer studs to vary the flexibility of the spokes.

HENRY LEVENE HARRIS.